May 2, 1961 R. L. WEGEL ET AL 2,982,924
WAVE TRANSLATING SYSTEMS
Filed Jan. 18, 1944

INVENTORS: R.L. WEGEL
R.F. WICK
BY
Walter C. Kiesel
ATTORNEY

2,982,924
WAVE TRANSLATING SYSTEMS

Raymond L. Wegel, Summit, and Ronald F. Wick, New Providence, N.J., assignors to Bell Telephone Laboratories, Incorporated, New York, N.Y., a corporation of New York Filed Jan. 18, 1944, Ser. No. 518,724

11 Claims. (Cl. 333—6)

This invention relates to wave translating systems or networks and more particularly to equipment for testing torpedoes having signal controlled steering systems of the type disclosed in the application Serial No. 499,139, filed August 18, 1943, of Ronald F. Wick.

One general object of this invention is to facilitate the testing of signal controlled steering systems of the type disclosed in the above-mentioned application. More specifically, one object of this invention is to enable the ready determination of a number of characteristics, such as sensitivity and stiffness, of such steering systems and operational factors, such as stability, of torpedoes including such steering systems.

In torpedoes having steering systems of the type disclosed in the application noted above, the rudder and elevator are controlled in accordance with signals emanating from a target to guide the torpedo to the target. The target signals are detected by pairs of hydrophones mounted on the torpedo, one pair for the rudder and one pair for the elevator, and the outputs of the hydrophones of each pair are resolved, in an associated network or channel, into a control signal related in polarity and amplitude to the phase difference between the signals detected at the pair of hydrophones. The elevator and rudder are deflected in accordance with the respective control signal, whereby the torpedo is guided to the target.

In one illustrative embodiment of this invention, equipment for testing a torpedo of the type described above comprises a source for generating signals simulating those to which the torpedo steering system is intended to be responsive in use, a pair of receivers adapted to be coupled to the hydrophones mounted upon the torpedo, and an electrical system coupling the source to the two receivers and including a pair of output channels each terminating at a corresponding one of the receivers.

In accordance with one feature of this invention, the coupling system comprises a delay network operatively associated with both the output channels and means associated with the delay network for cyclically varying the relative phase of the signals supplied to the two channels.

In accordance with a specific feature of this invention, the delay network comprises one or more lattice-type sections having a substantially linear phase shift-frequency characteristic over the range of frequencies employed and a pair of variable impedances, for example potentiometers, connected between the input and output sides of the network and each associated with a corresponding one of the output channels. The potential impressed across each impedance is proportional to the difference between the input and output voltages of the delay network. A variable portion of the potential appearing across either impedance is combined with the output voltage of the network and the resultant is supplied to the respective output channel while the other channel is connected directly to the input side of the network. If the impedances are potentiometers, each of the potentiometers includes a potentiometer resistance bridged by a short-circuiting connection, and a contact arm and the two contact arms are coupled to move in synchronism and are arranged so that while one contact arm moves over the associated resistance the other contact arm engages the short-circuiting connection across its associated resistance. Thus, the delay, introduced by the delay network, between the source and each output channel is variable and the relative phase of the signals supplied to the two output channels is likewise variable from a maximum in one sense to a maximum in the opposite sense.

In accordance with another feature of this invention, recorder means are provided for producing a graph indicative of the phase lag between the application of signals to the hydrophones and the deflection of the rudder or elevator in response thereto.

The invention and the above-noted and other features thereof will be understood more clearly and fully from the following detailed description with reference to the accompanying drawing, in which.

Figure 1:
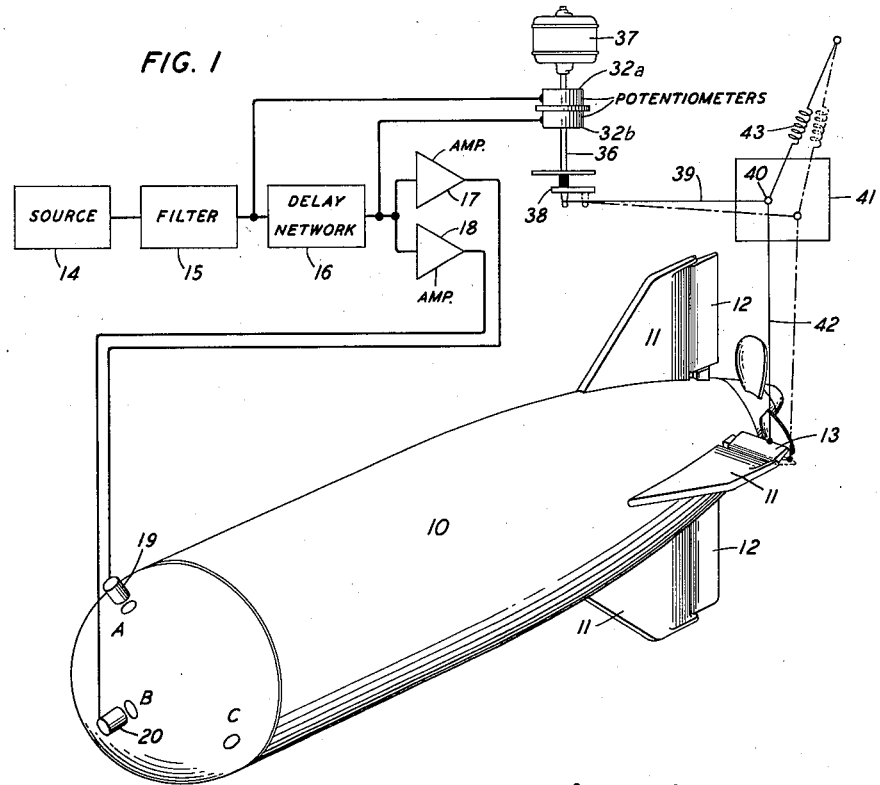
Fig. 1 is in part a perspective view of a torpedo including a steering system of the type which may be tested by equipment constructed in accordance with this invention and in part a diagram of such equipment.

Referring now to the drawing, the torpedo illustrated in Fig. 1 comprises a body 10 having fixed thereto fins 11 and on which a two-part rudder 12 and two-part elevator 13 are pivotally mounted. The torpedo comprises also a head carrying three hydrophones indicated at A, B and C. As disclosed in the above-identified application of Ronald F. Wick, signals detected at the hydrophones A and B are resolved into a control signal dependent in polarity and amplitude upon the phase difference between the signals detected by these two hydrophones and the elevator 13 is deflected in accordance with this control signal. Similarly, the signals detected by the hydrophones B and C are resolved into a control signal in accordance with which the rudder 12 is deflected.

The test equipment illustrative of this invention comprises a source 14 for generating complex signals simulating those for detection of which the torpedo hydrophones are intended, a filter 15 for passing those signals within the band of frequencies to which the control systems of the torpedo is designed to be responsive and a delay network 16. The delay network is associated with a pair of substantially identical amplifiers 17 and 18, the outputs of which are supplied to a pair of substantially identical receivers 19 and 20 matched in phase and having a flat response characteristic throughout the operating range. In use, the receivers are coupled to a pair of the hydrophones, either the hydrophones A and B or B and C.

In a particular system for testing a torpedo having a steering control system operable in response to the band of frequencies between 2 and 3 kilocycles in the frequency spectrum of noise emanating from a target, such as a submarine, the source 14 may be a resistance noise generator and the filter 15 may be of the band-pass type designed to pass frequencies between 2 and 3 kilocycles. The amplifiers 17 and 18 may be single or multistage devices, the output circuits of which are tuned broadly so that the frequencies within the operating band employed are amplified substantially uniformly.

Figure 3:
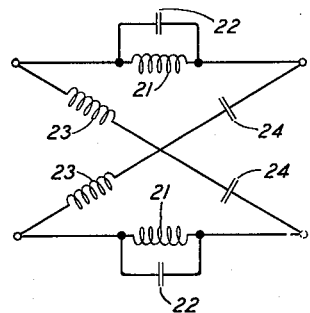
Fig. 3 is a diagram showing in typical section of the delay network included in the equipment illustrated in Figs. 1 and 2.

The delay network 16 is of the type having a linear phase shift-frequency characteristic over the operating frequency range employed. It comprises a section, or a plurality of sections adapted to be used separately or connected in tandem in any combination to produce time delays over a desired time range. In one construction, illustrated in Fig. 3, each section is a balanced lattice comprising identical series arms composed of an inductance 21 and condenser 22 in parallel therewith and identical shunt arms each composed of an inductance 23 and a condenser 24 in series therewith. In a particular construction suitable for use in a network operating on the band from 2 to 3 kilocycles per second the inductances 21 and 23 of one section may be approximately 16 and 13.5 millihenrys, respectively, and the condensers 22 and 24 may have capacitances of approximately .0015 and .00176 microfarad, respectively. For these constants the delay of the section is substantially 11 microseconds. With a network comprising five sections of the configuration shown in Fig. 3 and having constants corresponding to delays of 5, 11, 20, 23 and 46 microseconds, the delay obtainable is variable continuously from a minimum of zero to a maximum of approximately 105 microseconds.

The input terminals 25 of the delay network 16 are connected to the secondary winding of a transformer 26, the primary winding of which is bridged by a potentiometer resistance 27 having a condenser 28 associated therewith. The condenser serves to compensate for small phase shifts in the transformers 26 and 30. The output terminals 29 of the delay network 16 are connected to the primary winding of a transformer 30, the secondary winding of which is bridged by a potentiometer resistance 31. The corresponding ends of the resistances 27 and 31 are connected together as shown.

Connected between the resistance 27, which may be considered as the input impedance for the delay network, and the resistance 31, which may be considered as the terminating impedance for this network, are a pair of potentiometers 32a and 32b for varying the relative phase of the signals supplied to the amplifiers 17 and 18. Each potentiometer comprises a resistance 33, for example, of the order of 50,000 ohms in the specific construction noted above, in the form of a 180-degree arc, a short-circuiting connection 34, also in the form of a 180-degree arc, and a contact arm 35 rotatable through 360 degrees. The contact arms 35 are displaced substantially 180 degrees from each other and are mounted to be rotated simultaneously in the same direction as indicated by the arrows in Fig. 2. For example, as illustrated in Fig. 1, the contact arms 35 may be fixed to a drive shaft 36 driven by a motor 37. A variable coupling, not shown, may be provided between the motor and drive shaft, to vary the rate of rotation of the contact arms 35. Suitable rates are of the order of 2 revolutions per second and less.

Figure 2:
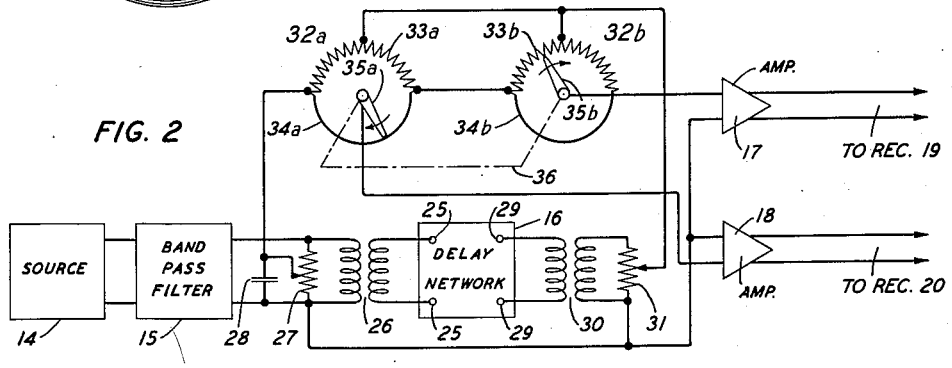
Fig. 2 is a circuit diagram illustrating the association of the electrical components of the testing equipment shown in Fig. 1.

The mid-points of the potentiometer resistances 33 are connected in common to the terminating resistance 31 and both ends of each resistance 33 are connected to the input resistance 27 as is apparent from Fig. 2. The contact arm 35a is connected directly to one input terminal of the amplifier 18 and the contact arm 35b is connected similarly to one input terminal of the amplifier 17. The other input terminals of the two amplifiers are connected in common directly to the common side of the resistances 27 and 31 as shown.

As will be seen, the potentials appearing between the mid-point of each potentiometer resistance and the two ends of each of these resistances are equal and proportional to the difference of the input voltage supplied to the delay network and the delayed voltage appearing at the terminating impedance 31 for this network. Inasmuch as the delay network has a linear phase shift-frequency characteristic and, hence, a constant time delay throughout the operating frequency range, the relative phase of the voltages applied to the inputs of the amplifiers 17 and 18 will be determined by the positions of the contact arms 35a and 35b. As each contact arm rides over the associated resistance 33, a linear variation of resistance with angle of contact arm displacement obtains and a corresponding alteration or shift in the phase of the signals supplied to the respective amplifier obtains. When either contact arm 35 is in engagement with the associated potentiometer resistance 33, the other arm is in engagement with the associated short-circuiting connection 34.

Specifically, when the contact arm 35b is in engagement with the potentiometer resistance 33b, the contact arm 35a is in engagement with the short-circuiting connection 34a, this condition existing for 180 degrees of rotation of the two contact arms. While the contact arm 35a is in engagement with the short-circuiting connection 34a, the amplifier 18 is connected, effectively, directly to the input side of the delay network and the amplifier input suffers no time delay. The voltage supplied to the amplifier 17, however, suffers a time delay which varies approximately linearly with the angle of rotation of the contact arm 35b along the potentiometer resistance 33b, the delay increasing for the first 90 degrees of rotation of the arm, that is from the left-hand terminal of the resistance 33b to the mid-point of this resistance, and decreasing for the next 90 degrees of rotation of the arm, that is from the mid-point of the resistance to the right-hand terminal thereof. A similar time delay is introduced in the input to the amplifier 18 when the contact arm 35a is in engagement with the potentiometer resistance 33a and the contact arm 35b is in engagement with the short-circuiting connection 34b. Thus, the phase difference between the signals supplied to the amplifiers 17 and 18 is variable continuously from a maximum in one direction to a maximum in the other direction. The several impedances constituting the delay network may be correlated, of course, to provide any desired maximum phase shift.

As has been pointed out heretofore, the rudder 12 and elevator 13 of the torpedo are deflected in accordance with the phase difference in the signals at the respective pair of hydrophones. The relative phase of the signals supplied to the hydrophones and the variation thereof with the time are known for any particular test equipment. A record indicative of the rudder, or elevator, deflection in relation to the phase differential at the hydrophones may be obtained readily by coupling the actuating element of a suitable recorder, not shown, to the rudder or elevator, respectively.

In order to obtain information indicative of the stability of the torpedo, the test equipment may be provided with means for indicating or recording the phase lag between the signals applied to the hydrophones and the rudder, or elevator. In one arrangement, illustrated in Fig. 1, a crank arm 38, advantageously of adjustable length, is fixed on the drive shaft 36 and is connected by a link 39, such as a cord, to a stylus 40 mounted to move over the surface of a recording sheet 41. The stylus 40 is connected also by a second link 42, such as a cord, to the elevator 13 or to the rudder. The cords 39 and 42 may be held taut by a spring 43 and extend at right angles to each other. Two positions of the links, stylus and spring, crank arm and elevator are illustrated in Fig. 1, one in full and the other in broken lines. It will be appreciated that the stylus 40 is moved in accordance with the resultant of two forces at right angles, one of the forces being proportional to elevator deflection and the other to phase difference between the signals applied to the hydrophones. Thus, the trace produced by the stylus 40 upon the recording sheet 41 will be indicative of the phase relation between the elevator deflection and signals supplied to the hydrophones.

Although a specific embodiment of the invention has been shown and described, it will be understood, of course, that it is but illustrative and that various modifications may be made therein. For example, although in the specific embodiment shown and described, the network 16 is composed of lattice-type sections and is of the linear phase type, the sections may be of other forms and the network may have other than a linear phase shift-frequency characteristic. Also, although the variable impedance elements 32 have been shown and described as potentiometer resistances, they may be of other forms, for example, inductive or capacitive. Other modifications may be made in the specific system described without departing from the scope and spirit of this invention as defined in the appended claims.

What is claimed is:

1. A wave translating system comprising a delay network having a preassigned phase shift-frequency characteristic, an input channel connected to said network, a pair of output channels, and means for associating said output channels with said input channel and said network to effect energization of said output channels by signals of like character and variable relative phase, said means comprising impedance means connected between the input and output sides of said network and means for simultaneously connecting either of said output channels to said input channel and connecting the other of said output channels of the output side of said network through a variable portion of said impedance means.

2. A wave translating system comprising a delay network having a predetermined phase shift-frequency characteristic, an input signal channel connected to said network, a pair of output channels, and means connecting said output channels to said network for effecting energization of said output channels by signals of like character determined by the input to said network and of variable relative phase, said means comprising a pair of potentiometer resistances each connected between the input and output sides of said network and a contact arm for each resistance connected to a corresponding one of said output channels.

3. A wave translating system comprising a delay network having a substantially linear phase shift-frequency characteristic over a preassigned band of frequencies, means for supplying signal voltages within said band to the input side of said network, a pair of signal transmitting channels, and means associating said pair of channels to said network to effect energization of said channels in variable relative phase, said associating means comprising variable impedance means energized proportionately to the difference between the input and output voltages of said network and means for selectively connecting said channels to said impedance means and to said network to vary the amplitude of the portion of said difference applied to one channel relative to that applied to the other channel.

4. A wave translating system comprising a delay network having a substantially linear phase shift-frequency characteristic over a preassigned band of frequencies, means for supplying signal voltages within said band to the input side of said network, a pair of signal transmitting channels, and means connecting said channels to said network including variable impedance means energized proportionately to the difference between the input and output voltages of said network for varying the relative phase of the signals supplied to said channels, said variable impedance means comprising a pair of potentiometer resistances and a contact arm for each resistance, each of said resistances being connected between the input and output sides of said network and each contact arm being connected to a corresponding one of said channels.

5. A wave translating system comprising an input channel, a pair of output channels, means for coupling said output channels to said input channel, said coupling means including a delay network having its input side connected to said input channel, a pair of impedances connected between the input and output sides of said network, a connection between each of said output channels and a corresponding one of said impedances, and means for altering both connections to vary the proportion of either of said impedances connected to the respective output channel and simultaneously short-circuiting the other of said impedances with respect to the respective output channel.

6. A wave translating system comprising an input channel, a pair of output channels, means for coupling said output channels to said input channel, said coupling means comprising a delay network the input side of which is connected to said input channel, means for deriving from said network two potentials each proportional to the difference between the input and output voltages of said network, and means for supplying to either of said output channels the resultant of the output potential of said network and a variable portion of a corresponding one of said potentials and simultaneously connecting the other channel to the input side of said network.

7. A wave translating system comprising an input channel, a pair of output channels, means for coupling said output channels to said input channel, said coupling means including a delay network having a substantially linear phase shift-frequency characteristic and having its input side connected to said input channel, a pair of elements for deriving from said network two substantially equal potentials each proportional to the difference between the input and output voltages of said network, means for connecting each of said output channels to said network including a connection between each of said elements and a corresponding one of said output channels, and means for controlling said connecting means to supply to either of said channels the resultant of the output potential of said network and a linearly variable proportion of a corresponding one of said potentials and simultaneously connecting the other channel effectively to the input side of said network.

8. A wave translating system comprising a delay network having a preassigned phase shift-frequency characteristic, a pair of output channels, means for supplying energizing voltages to the input side of said network to produce corresponding delayed voltages at the output side of said network, a pair of impedances connected between the input and output sides of said network, a short-circuiting connection across each of said impedances, a first connection between each of said output channels and said network, and a second connection between each output channel and said network, each of said second connections including an adjustable contact engageable with a corresponding one of said impedances and the short-circuiting connection therefor, the contacts being arranged so that when either contact is in engagement with the associated impedance the other contact is in engagement with the respective short-circuiting connection.

9. A wave translating system comprising a delay network having a preassigned phase shift-frequency characteristic, means for supplying voltage to the input side of said network, a pair of output channels each having a pair of input terminals, a connection between one terminal of each channel and said network, a pair of potentiometer resistances each connected between the input and output sides of said network, a short-circuiting connection across each of said resistances, a pair of switching members each connected to the other terminal of a corresponding one of said channels, and means for actuating said switching members to connect a variable portion of either resistance in circuit with a corresponding one of said other terminals and to simultaneously connect the other of said other terminals to the short-circuiting connection for the other resistance.

10. A wave translating ssytem comprising a linear phase delay network, means for supplying input voltage to said network, a pair of output channels each having a pair of input terminals, a common connection between one terminal of each pair and said network, a pair of substantially semicircular potentiometer resistances, a short-circuiting connection across each of said resistances, a common connection between the mid-points of each of said resistances and the output side of said network, a connection between each of said short-circuiting connections and a common point on the input side of said network, a pair of rotatable contact arms each mounted for engagement with a corresponding resistance and the short-circuiting connection thereacross, said arms being positioned so that when one arm is in engagement with the associated resistance the other arm is in engagement with the associated short-circuiting connection, means for rotating said arms in synchronism, and a connection between each arm and the other terminal of a corresponding one of said channels.

11. In combination, a utility comprising a pair of signal translating devices and a movable operating element actuated in accordance with the phase difference between signals applied to said devices, a wave translating system including an input channel, a pair of output channels each coupled to a corresponding one of said devices, a delay network associating said input channel with said output channels, means for cyclically varying the relative phase of signals supplied to said output channels from said input channel, said means including an actuating element revolvable in synchronism with the cyclic variation of the relative phase of signals supplied to said output channels, and means for comparing the phase relation of the motions of said operaing element and said actuating element.

References Cited in the file of this patent

UNITED STATES PATENTS 2,147,728     Wintringham  ---------- Feb. 21, 1939